E. J. FRANKLIN
July 25, 1933.
WATER TUBE STEAM BOILER
Original Filed July 7, 1925
Re. 18,901
3 Sheets-Sheet 1
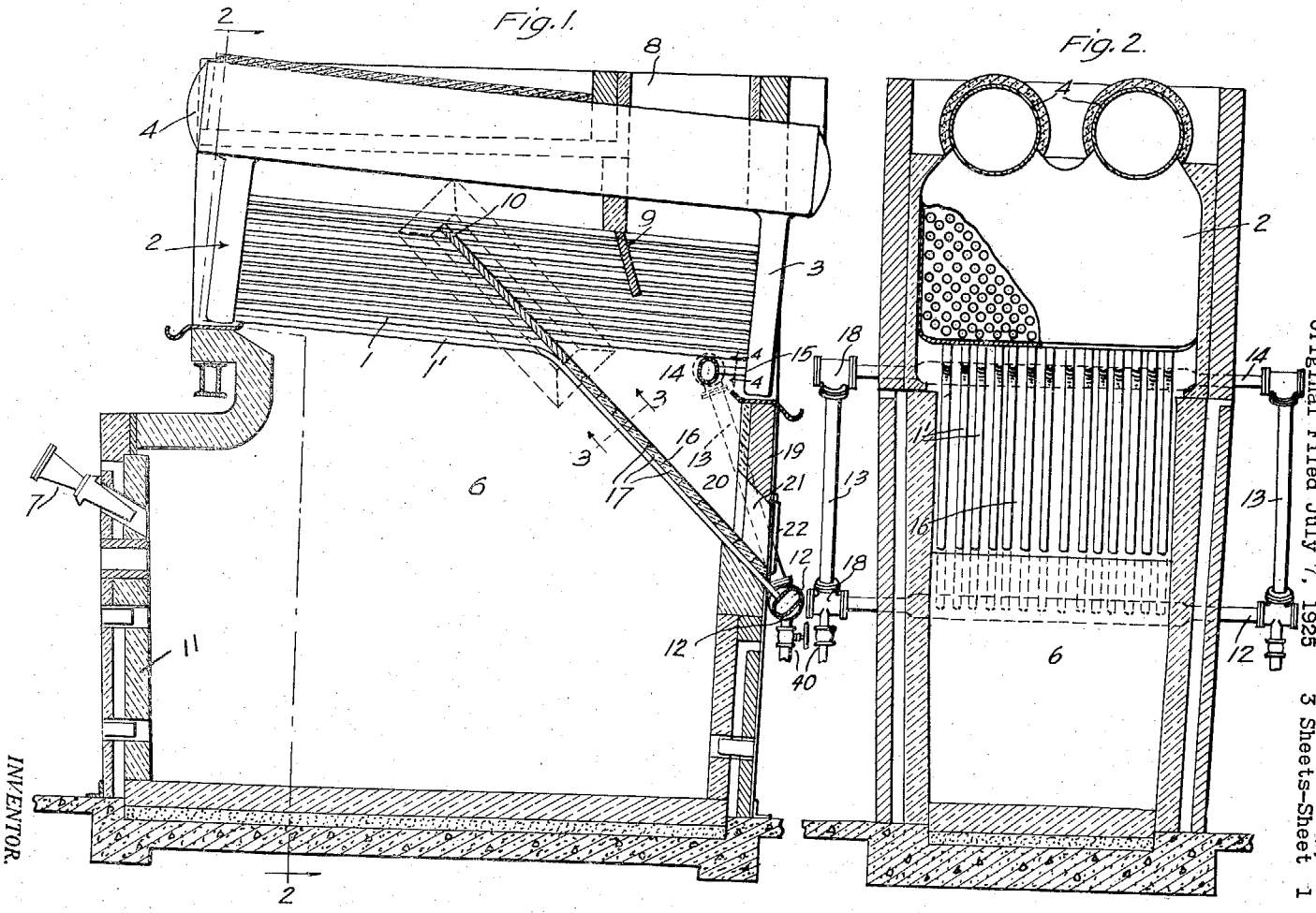
INVENTOR.
Edward J. Franklin
BY Arthur P. Knight
ATTORNEY.

E. J. FRANKLIN
July 25, 1933.
WATER TUBE STEAM BOILER
Original Filed July 7, 1925
Re. 18,901
3 Sheets-Sheet 2
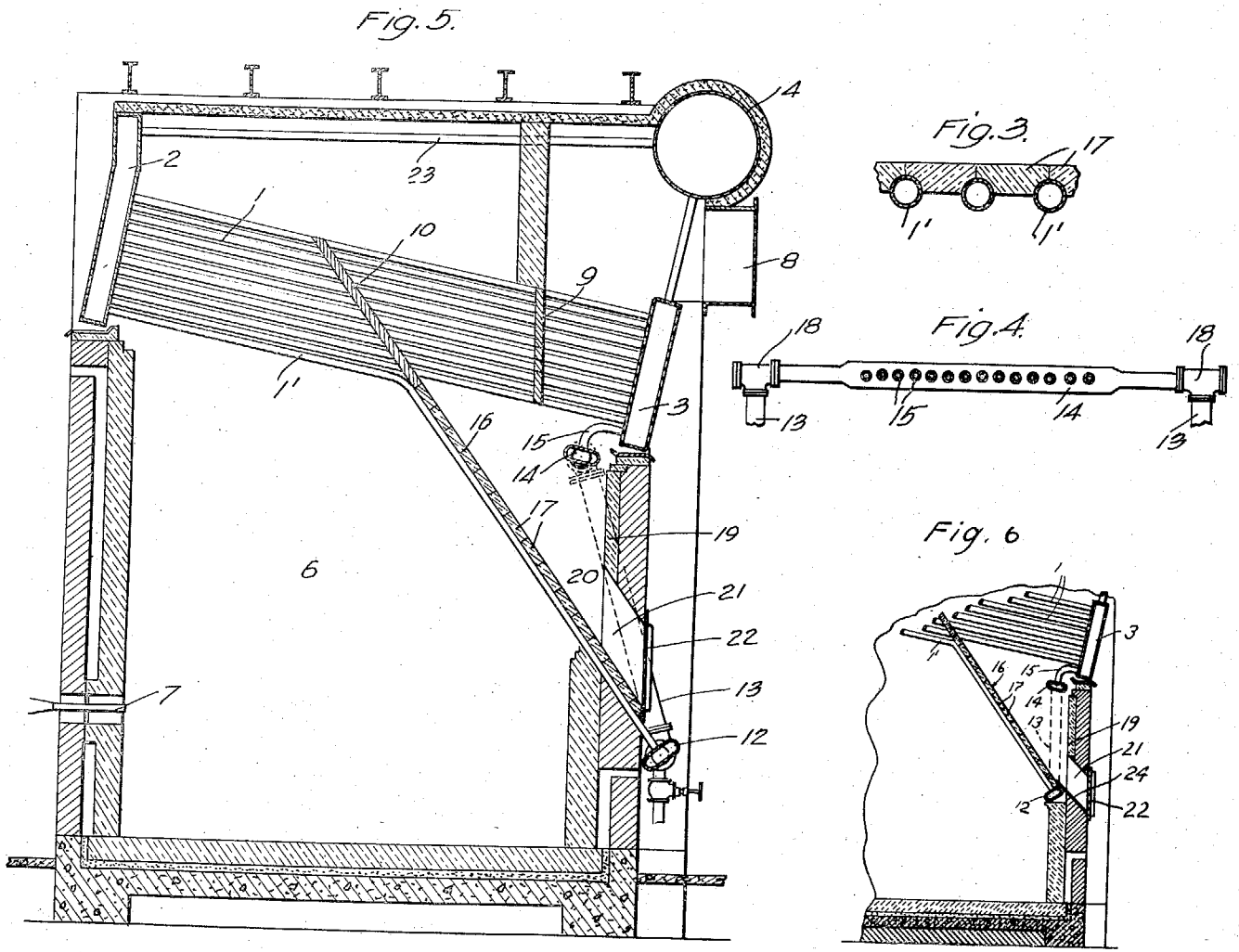
INVENTOR.
Edward J. Franklin
BY
Arthur P. Knight
ATTORNEY.

E. J. FRANKLIN

July 25, 1933.

WATER TUBE STEAM BOILER

Original Filed July 7, 1925

Re. 18,901

3 Sheets-Sheet 3

INVENTOR.

Edward J. Franklin

BY Arthur P. Knight

ATTORNEY.

Reissued July 25, 1933 Re. 18,901

UNITED STATES PATENT OFFICE

EDWARD J. FRANKLIN, OF SALT LAKE CITY, UTAH

WATER-TUBE STEAM BOILER

Original No. 1,634,139, dated June 28, 1927, Serial No. 41,963, filed July 7, 1925. Application for reissue filed October 2, 1931. Serial No. 566,542.

This invention relates to water tube steam boilers, and more especially to a novel arrangement of boiler and rear or bridge wall baffle. The main objects of the invention are to expose a greater tube surface to the radiant heat of the furnace; to eliminate the necessity of a fire brick bridge wall; to provide maximum combustion space with given boiler setting dimensions; to provide a more suitable pocket or chamber for the collection and easy disposal of ash, flue dust or soot which may collect from the back passes; to increase the circulation of water in the boiler, and especially in the lowest row of tubes and thus prevent deposition of scale or sediment with the resultant failure of tubes; to protect the furnace brick work both by direct screening effect of back and side walls and by reducing the heat in the combustion chamber; to reduce furnace maintenance costs by eliminating large fire brick bridge walls commonly in use, and by reducing furnace temperatures due to increased radiant heating surface exposed to combustion chamber.

The invention is particularly applicable to the straight tube type of boilers such as the Heine, Babcock & Wilcox, Edgemoor and Casey-Hedges steam boilers, but is also applicable with certain modifications to other types of water tubes such as the bent tube boilers of Stirling or similar types.

The accompanying drawings illustrate embodiments of my invention and referring thereto:

Figure 1 is a longitudinal section of a straight tube boiler provided with my improved water tube bridge wall baffle.

Fig. 2 is a section on line 2—2 in Fig. 1, with part of the front header broken away.

Fig. 3 is a section on line 3—3 in Fig. 1.

Fig. 4 is a section on line 4—4 in Fig. 1.

Fig. 5 is a view similar to Fig. 1 showing the application of the invention to a straight tube boiler of a somewhat different construction.

Fig. 6 is a partial section showing a different location of the water circulating system for the lower row of tubes.

Figure 8:
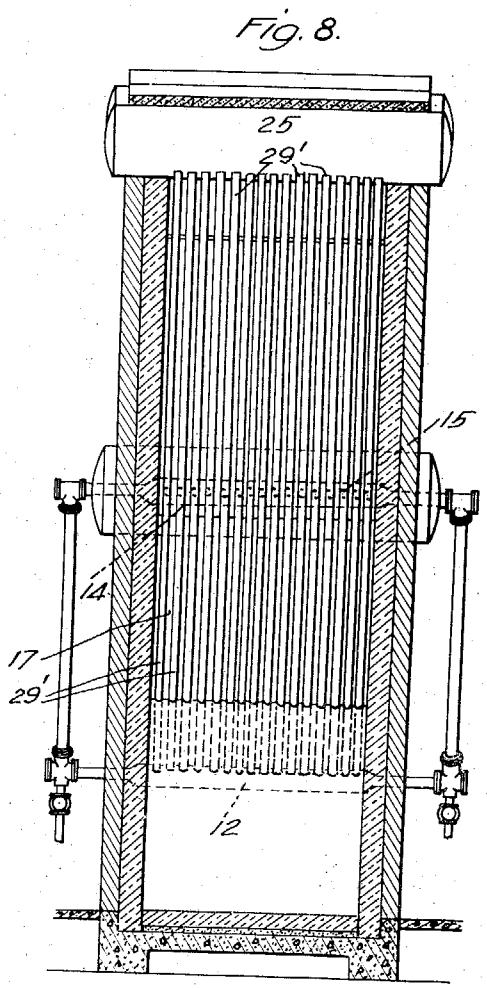
Fig. 8 is a section on line 8—8 in Fig. 7.

Referring to Figs. 1 and 2 the steam boiler therein shown comprises a series or bank of water tubes 1 connected to forward and rear headers 2 and 3 which are also connected to the steam drums 4. The usual means are provided for drawing off steam from the steam drum and for supplying water to the boiler. The boiler is located over a fire-box or combustion chamber 6 which may be provided with any suitable means for firing the same, for example, a burner 7, for oil or other fuel and with suitable means for the admission and regulation of air supplied for combustion. A stack outlet 8 is provided at the upper rear portion of the boiler setting, and baffles 9 and 10 of firebrick, iron or other suitable refractory construction are arranged in such manner as to intercept the gas passing from the fire-box to the stack and deflect such gas so as to cause same to pass several times between the water tubes in well known manner. The baffle plate 10 may be arranged in accordance with the usual practice, preferably inclined or obliquely extending from nearly the top of the water tubes to the bottom thereof in a downward and rearward direction and according to my invention a supplementary or additional baffle means 16 is provided, preferably in line with this baffle plate 10, and formed of firebrick, iron or other suitable refractory material supported and protected by water tubes as hereinafter described.

In applying my invention to a boiler of the straight tube type I prefer to bend the lower row of tubes indicated at 1′ downwardly where they approach the inclined baffle plate 10 and to extend said tubes in oblique downward direction to the rear end of the fire-box. Said downwardly bent portions may extend at any suitable angle, for example at an angle of from 30° to 75° to the horizontal. In the form shown the rear portions of these tubes are bent at an angle of approximately 45° to their front portions and to the remaining tubes. As shown in the drawings, said boiler tubes 1′ may extend through the rear wall of the fire box and be connected to a lower header 12 outside and immediately adjacent the rear wall 19 of the furnace. Said lower header may be connected at its ends by pipes 13 extending either inside or outside of the furnace walls to an upper header 14 which is connected by pipes 15 to the rear header or water leg 3 of the steam boiler. Baffle means 16 consisting for example of plates or slabs of refractory material indicated at 17 are arranged back of and overlying ahe oblique portions of water tubes 1′ so that said baffle means are supported by such water tubes and are protected by the water tubes to a large extent from the heat of the combustion chamber. The upper and lower headers 14 and 12 may be provided with T's 18 where they are connected to the pipes 13 to facilitate cleaning of these headers, the outer opening of said T's being plugged in normal operation. Suitable blowoff means 40 may also be provided at the ends of the lower header.

The baffle wall 16 cooperates with the rear wall 19 of the furnace to form a pocket 20 for the collection of ashes, soot, dust, etc., from the back passes, and a suitable means may be provided for permitting access to said pocket or for removal of collected material therefrom, for example an access opening 20 with door 22.

The construction of the boiler shown in Fig. 5 is substantially the same as that above described with the exception that the drum 4 is located at the rear of the boiler setting and extends transversely with respect to the tubes and is connected to the front header 2 by means of pipes 23. I have also shown the short pipes 15 connecting the header 14 to the water leg 3 as being bent at right angles in this case, although either the straight or bent form of connecting pipe is adaptable to either type of boiler construction.

In the operation of the boilers above described fuel and air are admitted through burner means 7 and combustion takes place in the combustion chamber 6. It may be noted that by forming the bridge wall baffle as substantially a continuation of the baffle 10 and carrying it downwardly and rearwardly a larger combustion chamber is provided than is the case in the usual type of construction in which a fire brick bridge wall is provided extending vertically downward from the lower end of baffle 10, that is approximately from the position of the upper end of the bridge wall baffle 16 of my invention. By means of my improved construction a substantially unobstructed combustion chamber is provided extending from the front wall 11 of the furnace to the rear wall 19. The provision of such a large unobstructed combustion chamber is of particular advantage in connection with the burning of liquid, gaseous, or powdered fuel, as it permits more complete combustion of such fuel therein. The hot products of combustion pass up over the upper edge of baffle 10, down between baffles 10 and 9, and thence out to the stack outlet 8, giving up their heat to the water tubes in their passage to heat the water therein. The lower row of tubes 1′ are exposed to the most intense heat and particularly the inclined portions thereof in front of the baffles 16. In addition to heat received directly from the hot gases, these tubes are exposed to radiation of heat from the hot walls of the combustion chamber and also take up heat received by radiation onto the baffle 16 with which such tubes are in contact at their inclined portions. The rapid heating of the water thus produced in these tubes causes an extremely good circulation of water therein and not only produces an efficient utilization of the heat but also prevents deposition of the scale or sediment in the tubes. The direction of circulation of water is downward in the connecting pipes 13 and upward in the tubes 1′. The tubes 1′ being directly connected with the boiler improve the entire circulation therein.

The reception of a considerable amount of heat by radiation onto these tubes cools the combustion chamber somewhat below the temperature produced in the ordinary type of boiler in which the combustion chamber is almost entirely surrounded by fire brick and thus protects the furnace brick work. Furthermore the inclined portions of the tubes 1′ serve to protect the brick or refractory plates 17 both by direct screening action and by taking up heat therefrom. In addition to the above advantageous features the elimination of the fire brick bridge wall now used in itself materially reduces the cost of maintenance of the furnace.

Any soot, dust, or ashes collecting above the baffle 10 or the bridge wall baffle 16 settles to the bottom of pocket 20 and may be easily removed from time to time by removing door 22 and cleaning out the collected material through the opening 21. In the ordinary type of water tube boiler any solid material deposited in the back passes collects between the tubes and is very difficultly removed. By providing the lower-most row of tubes, according to my invention, with portions extending clear of and below the other tubes and providing a wall of refractory material on such portions of these tubes, a readily accessible and easily cleaned pocket is provided between said wall of refractory material and the rear wall of the furnace, into which such deposited solid material falls and from which it may be removed easily.

While I prefer, for the sake of convenience and superior construction, to locate the lower header 12 outside the rear wall of the furnace as above described, it may in some cases be located inside, but immediately adjacent the rear wall, as shown in Fig. 6. In such case the lower tubes 1′ do not extend through the rear wall but header 12 extends through the side walls for connection to pipes 13. In order to facilitate the cleaning a metal plate 24 may be provided over the header 12.

Figure 7:
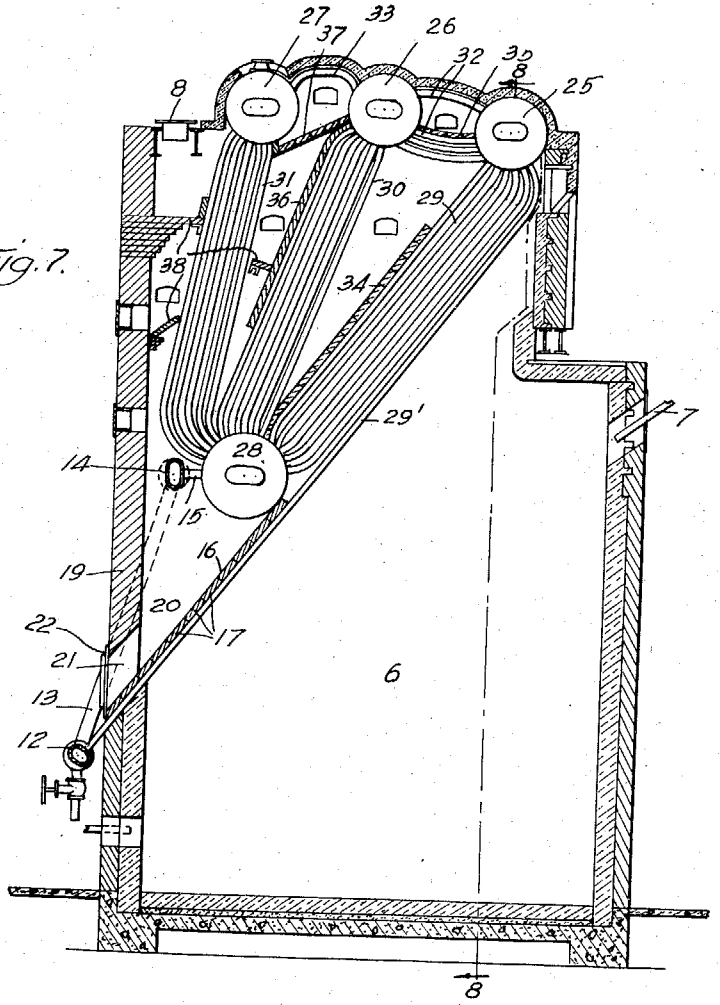
Fig. 7 is a longitudinal section of a bent tube boiler provided with a bridge wall baffle according to my invention.

As shown in Figs. 7 and 8 the bridge wall baffle according to my invention may also be applied in connection with boilers of the bent tube type such as the Stirling boiler. The boiler shown in these figures comprises the usual steam, water and mud drums 25, 26, 27 and 28 connected in the usual manner by banks of tubes indicated at 29, 30, 31, 32 and 33, and provided with the usual means for feeding water thereto and permitting withdrawal of steam therefrom. Baffle means of suitable refractory material may also be provided arranged in any suitable manner for example as indicated at 34, 35, 36, 37 and 38, so as to cause the hot combustion gases to pass between the tubes in a circulatory manner, to the stack outlet 8.

According to my invention the lowest row of tubes 29′ of the front bank of tubes 29 are continued on down below the lower drum 28 and extend downwardly and rearwardly to a lower header 12 located outside the furnace wall. The portion of the tubes 29′ below the drum 28 may as shown be in a direct line with the upper portions of these tubes or they may if desired be bent at any suitable angle to such upper portions in order to provide the desired slope, say from 30° to 75° to the horizontal. A bridge wall baffle 16 comprising for example refractory slabs, plates, or bricks 17 is provided as before, above and supported by the lower portions of these tubes so as to direct the combustion gases upward and eliminate the necessity for the usual fire brick bridge wall extending vertically downward from drum 28. The lower header 12 is connected as before at its ends by means of pipes 13 to the upper header 14 which is connected by short pipes 15 to the drum 28. It will also be seen that as before an unobstructed combustion chamber is provided extending between the front and rear walls of the furnace, and the baffle 16 cooperates with the rear furnace wall 19 to form a pocket 20 for the collection of soot, dust and ashes, and opening 21 and door 22 are provided for the removal of such collected material. The manner of operation of this type of boiler is well understood, including the direction of flow of the hot combustion gases therethrough, and the manner of operation and advantageous features of my invention are substantially the same in this case as in the forms above described.

The invention comprises in any case a row of tubes located below or constituting the lower-most row of a bank of water tubes and having inclined portions extending rearwardly and downwardly, preferably at an angle of between 30° and 75° to the horizontal, from a position above the combustion chamber to a position at the rear of the combustion chamber and preferably outside the rear wall of the furnace, and inclined baffle means consisting of refractory material located above and supported by, and preferably in direct contact with said inclined portions of these tubes, said inclined portions being thus adapted to receive heat by radiation from the furnace walls and by conduction from said baffle means as well as from the hot combustion gases themselves, and said baffle means being so disposed as to direct the combustion gases into contact with the bank of water tubes. Furthermore the said inclined portions of the lowermost tubes extend free of the remaining tubes of said bank, and in such a position that a pocket is provided above and behind said baffle means, for the collection and easy removal of deposited solid material. Also, in all the constructions shown, a large and unobstructed combustion chamber is provided between the front and rear furnace walls, so as to provide ample space below the tubes for the complete combustion of liquid, gaseous, or powdered fuels.

I hereby disclaim so much of the subject matter of invention herein disclosed as is disclosed also in the application with which my orginal patent was in interference, namely, application of J. G. Coutant, Serial No. 60,435, filed October 5, 1925, for Pulverized fuel combustion, claiming the French filing date of October 7, 1924.

What I claim is:

1. In combination with a furnace having walls enclosing a combustion chamber, a boiler having a plurality of rows of inclined water tubes above said combustion chamber and connected for circulation of water therethrough, said tubes extending from a lower rear connecting vessel or header inclinedly upwardly to a higher front connecting vessel or header, and a single supplemental row of said tubes the same having their front ends connected into said higher vessel for circulation in the boiler, and extended first rearwardly below and parallel to the boiler tubes and then having the rear end portions thereof extended downwardly below the boiler from a position adjacent the remaining rows of tubes at a substantial slant to a connecting header in a protected position, and such connecting header, downtake connections from the lower rear vessel feeding water to said connecting header and thereby to the lower rear ends of such extended single row of tubes, wall elements of refractory material associated with said slantingly extended portions of said single row of tubes to form a closed wall wholly below the boiler and bounding the combustion chamber and exposed directly to the radiant heat therein, a furnace wall to the rear of such closed wall, and such closed wall and rear wall cooperating to provide a downwardly extending pocket wholly below the boiler for collection of ashes or solid material settling from the boiler, with means permitting discharge of material from said pocket, and there being in closed relation to said closed wall an upward baffle extension into the boiler to form ascending and descending passes therein.

2. In combination with a furnace having walls enclosing a combustion chamber, a boiler having a plurality of rows of inclined water tubes above said combustion chamber and connected for circulation of water therethrough, said tubes extending from a lower rear boiler header inclinedly upwardly to a higher front boiler header, and a single supplemental row of said tubes the same having their front ends connected into said higher header for circulation in the boiler, and extended first rearwardly below and parallel to the boiler tubes and being then bent and the rear end portions thereof extended and diverted downwardly below the boiler from a position intermediate the ends of the remaining rows of tubes relatively steeply to a connecting header in a protected position, downtake connections from the lower rear boiler header feeding water to said connecting header and thereby to the lower rear ends of such extended single row of tubes, wall elements of refractory material associated with said steeply extended portions of said single row of tubes to form a closed wall wholly below the boiler and bounding the combustion chamber and exposed directly to the radiant heat therein, a furnace wall to the rear of such closed wall and such closed wall and rear wall cooperating to provide a downwardly extending pocket wholly below the boiler for collection of ashes or solid material settling from the boiler, with means permitting discharge of material from said pocket, and said closed wall having an upward baffle extension into the boiler to form ascending and descending passes therein.

EDWARD J. FRANKLIN.